UNITED STATES PATENT OFFICE.

AUGUST FERDINAND KNIESCHE, OF SYRACUSE, NEW YORK.

PROCESS OF DEVELOPING THE FERMENTABLE PRODUCTS FROM GRAIN.

No. 825,662.   Specification of Letters Patent.   Patented July 10, 1906.

Application filed April 30, 1904. Serial No. 205,805.

*To all whom it may concern:*

Be it known that I, AUGUST FERDINAND KNIESCHE, a citizen of the United States, and a resident of Syracuse, in the county of Onondaga and State of New York, have invented certain new and useful Improvements in the Processes of Developing the Fermentable Products from Grain, of which the following is a specification.

This invention relates to certain new and useful improvements in the process of developing the fermentable products in a grain mash for the preparation of compressed yeast and alcohol, and has for its object to facilitate and cheapen the process and render the mash more productive of such products as are capable of fermentation and distillation, as well as to improve the quality thereof.

In carrying out my invention I place corn-meal in a suitable tub or cooker with water and allow it to cook for a sufficient length of time at a temperature of about 212° Fahrenheit (boiling temperature) until it has formed a perfect starch-paste. I then cool it down to a temperature of 150° Fahrenheit and stir in uncooked dry rye-meal. It is essential to use the rye-meal in this form and at no higher temperature, so as to prevent browning, roasting, and scorching the albumen of the rye-meal, thereby rendering a brighter color of the yeast product. After this mash has been cooled down to a temperature of about 140° Fahrenheit I add malt-meal. Before adding the malt-meal, however, I macerate it in water at a temperature of from 50° to 80° Fahrenheit until the water has taken up the diastase and other soluble parts of the malt. I then add this preparation of malt and water, which contains the diastase in its full strength, to the mash, the whole when mixed being raised to a temperature of from 140° to 142° Fahrenheit. The whole mash is then allowed to rest at this temperature from one to two hours to convert the contained starch into fermentable sugar. It is then cooled down to from 75° to 80° Fahrenheit and is now ready for fermentation.

From practical experience I have found that by the use of this process I am enabled to readily convert the starch of the mash into fermentable sugar and to obtain after fermentation two pounds more of yeast, and also after fermentation and distillation from one to one and a half quarts more of proof alcoholic liquid for each bushel of the grain used than can be obtained by the ordinary processes now in common use. The yeast produced by my process is also found to be of a much better quality. It is evident, however, that this same process will be fully available and useful for all kinds of grain mashes which are to be used in producing fermented and distilled liquors, as well as vinegar.

By having the malt solution ready and by boiling the corn-meal first, then cooling it down to about 140° to 144° Fahrenheit, and adding the malt in its full strength to the boiled and cooled corn mash I am enabled to obtain a more perfect saccharification than by the processes now in common use.

It is certainly understood that the given temperatures, especially in preparing the malt solution, must be strictly kept to insure a clean fermentation free from all undesired germs, thus insuring a pure culture of the *Saccharomyces cerevisæ*, which represents the compressed yeast.

This process is mainly directed to the manufacture of alcohol and compressed yeast.

I claim—

1. A process of developing the fermentable products in a grain mash, consisting of macerating malt-meal in cool water until it has taken up the soluble parts of the malt, and then adding this mixture to a mash of cooked cornmeal and uncooked rye-meal and cooling the mash substantially as specified.

2. The process of the class described, consisting in preparing a mash of cornmeal, cooking the same for a sufficient length of time at a boiling temperature of about 212° Fahrenheit, cooling this corn mash down to a temperature of 150° Fahrenheit, and then stirring in uncooked dry rye-meal, and adding to this mash a mixture formed by macerating malt-meal in water at a temperature from 50° to 80° Fahrenheit, until the water has extracted and taken up the diastase and other soluble parts of the malt, then allowing the whole mixture to rest from one to two hours at a temperature of about 142° Fahrenheit to convert the contained starch into fermentable sugar, and then cooling the entire mixture down to 75° to 80° Fahrenheit, substantially as specified.

3. The process of developing the fermentable products in a grain mash consisting in macerating malt-meal in water at a temperature of from 50° to 80° Fahrenheit until the water has taken up the diastase and other soluble parts of the malt, then adding this preparation of malt and water to a mash formed by cooking the cornmeal in water for a sufficient length of time to make a perfect starch-paste, then stirring in dry ryemeal into the cooked cornmeal and water, allowing the whole mixture to rest for from one to two hours at a temperature of about 142° Fahrenheit, to convert the starch-paste into fermentable sugar, and then cooling the mixture down to 75° to 80° Fahrenheit, substantially as specified.

In testimony that I claim the foregoing as my invention I have signed my name, in presence of two witnesses, this 7th day of April, 1904.

AUGUST FERDINAND KNIESCHE.

Witnesses:
D. P. HENWOOD,
JOHN BINNING.